(12) United States Patent
Yuanzhu

(10) Patent No.: US 8,358,236 B2
(45) Date of Patent: Jan. 22, 2013

(54) WIRELESS SENSOR APPARATUS

(75) Inventor: Dou Yuanzhu, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 279 days.

(21) Appl. No.: 12/904,658

(22) Filed: Oct. 14, 2010

(65) Prior Publication Data

US 2011/0095942 A1    Apr. 28, 2011

(30) Foreign Application Priority Data

Oct. 22, 2009    (JP) ................................ 2009-242976

(51) Int. Cl.
*G01S 7/28*    (2006.01)
(52) U.S. Cl. ......................................... 342/28; 342/188
(58) Field of Classification Search .................... 342/28, 342/188
See application file for complete search history.

(56) References Cited

U.S. PATENT DOCUMENTS

| | | | | |
|---|---|---|---|---|
| 4,544,926 A * | 10/1985 | Giuli | ................................ | 342/19 |
| 4,910,468 A * | 3/1990 | Ohtsuka et al. | ............... | 329/316 |
| 5,710,799 A * | 1/1998 | Kobayashi | .................... | 375/349 |
| 5,844,950 A * | 12/1998 | Aono et al. | .................... | 375/346 |
| 7,982,586 B2 * | 7/2011 | Ovard et al. | ................. | 340/10.4 |
| 2011/0057829 A1* | 3/2011 | Yuanzhu | ......................... | 342/28 |
| 2011/0095936 A1* | 4/2011 | Yuanzhu | ......................... | 342/27 |
| 2011/0095942 A1* | 4/2011 | Yuanzhu | ....................... | 342/188 |

FOREIGN PATENT DOCUMENTS

| | | |
|---|---|---|
| JP | 2004-245602 | 9/2004 |
| JP | 2007-170990 | 7/2007 |

* cited by examiner

*Primary Examiner* — John B Sotomayor
(74) *Attorney, Agent, or Firm* — Hunton & Williams LLP

(57) ABSTRACT

A wireless sensor apparatus includes first and second polarization antennas whose polarization surfaces of radiation waves are mutually orthogonal, a first mixer circuit connected to the first polarization antenna and configured to input a first reception signal received by the first polarization antenna, a second mixer circuit connected to the second polarization antenna and configured to input a second reception signal received by the second polarization antenna, a signal generation circuit configured to generate pulse signals fed to the first and second polarization antennas and also supplied to the first and second mixer circuits, and a differential amplification circuit configured to perform a differential amplification on a mixed output obtained by mixing the first reception signal and the pulse signal by the first mixer circuit and a mixed output obtained by mixing the second reception signal and the pulse signal by the second mixer circuit.

6 Claims, 3 Drawing Sheets

WIRELESS SENSOR APPARATUS

CLAIM OF PRIORITY

This application claims benefit of Japanese Patent Application No. 2009-242976 filed on Oct. 22, 2009, which is hereby incorporated by reference in its entirety.

BACKGROUND OF THE DISCLOSURE

1. Field of the Disclosure

The present disclosure relates to a wireless sensor apparatus for detecting a motion or the like of an object on the basis of a reflected wave of the object by using a wireless wave.

2. Description of the Related Art

Japanese Unexamined Patent Application Publication No. 2004-245602 discloses an apparatus configured to feed an output signal from an oscillator to an antenna for radiating a wireless wave, receive a reflected wave obtained while this wireless wave is reflected by an object, and detect an orientation and a motion of the object on the basis of the received reflected wave.

FIG. 3 shows a wireless sensor apparatus configured to detect a motion or the like of an object by using a pulse signal output from an oscillator. A wireless sensor apparatus 1 shown in FIG. 3 is provided with two transmission and reception antennas A1 and A2. Two pulse signals are output at a same timing from an RF oscillating circuit 2 to be fed to the transmission and reception antennas A1 and A2 and also sent to mixer circuits 3a and 3b as local signals. Wireless waves are radiated from the transmission and reception antennas A1 and A2 which are supplied with the pulse signals, and reflected waves which are reflected from an object O are respectively received by the transmission and reception antennas A1 and A2. The received reflected waves are input to the mixer circuits 3a and 3b as electric reception signals and mixed with a part of the pulse signals input from the RF oscillating circuit 2 while being temporally overlapped. Signals output from the mixer circuits 3a and 3b are input to a differential amplification circuit 4 for differential amplification, and low frequency components (including a DC signal) are taken out in a low-pass filter (LPF) 5. The signals passing through the LPF 5 are converted into digital signals by an A/D converter which is not shown in the drawing and taken in into a signal processing circuit 6.

In the signal processing circuit 6, the presence or absence of the motion of the object O is detected on the basis of the signal of the low frequency components output from the low-pass filter (LPF) 5. If the object in a halt state, as outputs of mixer circuits 3a and 3b on left and right have no changes, an output of the differential amplification circuit 4 also has no change. However, if the object O moves, the outputs of mixer circuits 3a and 3b on left and right become different from each other, and a differential amplification is conducted in the differential amplification circuit 4. Thus, the motion of the object O can be detected on the basis of a change of the output signals. A differential amplification output of the differential amplification circuit 4 appearing along with the motion of the object O is a low frequency component, and this output is subjected to the low-pass filter 5 to remove high frequency components and unnecessary noise for only taking out a necessary signal.

However, in the wireless sensor apparatus 1 shown in FIG. 3, as the transmission and reception antennas A1 and A2 are supplied with the pulse signals at the same time from the RF oscillating circuit 2, a problem occurs in which the wireless waves radiated from the respective antennas A1 and A2 at the same time function as mutual disturbing waves for causing an interference. As in the wireless sensor apparatus 1 described above, in a case where the wireless waves are radiated from the two transmission antennas A1 and A2 at the same time in order to improve an antenna reception sensitivity, it is necessary to secure an isolation between the antennas which significantly affects the antenna reception sensitivity and a dynamic range. However, in a case where a distance between the antennas is increased to cancel the interference, the size of the apparatus becomes larger, and therefore a problem occurs in which it is difficult to satisfy both the antenna reception sensitivity and the miniaturization of the apparatus.

These and other drawbacks exist.

SUMMARY OF THE DISCLOSURE

Embodiments of the present disclosure have been made in view of the above-mentioned problem and provide a wireless sensor apparatus capable of preventing, in a case where a simultaneous radiation is performed from a plurality of antennas, a radiation wave radiated from one antenna from becoming an interference wave for the other antenna and realizing a miniaturization of the apparatus.

A wireless sensor apparatus according to an embodiment includes: first and second polarization antennas whose polarization surfaces of radiation waves are mutually orthogonal; a first mixer circuit connected to the first polarization antenna and configured to input a first reception signal received by the first polarization antenna; a second mixer circuit connected to the second polarization antenna and configured to input a second reception signal received by the second polarization antenna; a signal generation circuit configured to generate pulse signals fed to the first and second polarization antennas and also supplied to the first and second mixer circuits; and a differential amplification circuit configured to perform a differential amplification on a mixed output obtained by mixing the first reception signal and the pulse signal by the first mixer circuit and a mixed output obtained by mixing the second reception signal and the pulse signal by the second mixer circuit According to this configuration, as the mutually orthogonal polarized waves are radiated from the first and second polarization antennas, even when the polarized waves are radiated from the first and second polarization antennas at the same time, the radiation wave radiated from the first polarization antenna does not become the interference wave for the second polarization antenna, and the radiation wave radiated from the second polarization antenna does not become the interference wave for the first polarization antenna. Thus, the interference to the other antenna is prevented. Therefore, it is possible to prevent the wireless waves from interfering without expanding the antenna interval, and the miniaturization of the wireless sensor apparatus can be realized.

In the above-mentioned wireless sensor apparatus, the first polarization antenna can be composed of a vertical polarization antenna, and the second polarization antenna can be composed of a horizontal polarization antenna.

In the above-mentioned wireless sensor apparatus, the first polarization antenna can be composed of a right-handed circularly polarized wave antenna, and the second polarization antenna can be composed of a left-handed circularly polarized wave antenna.

In the above-mentioned wireless sensor apparatus, the first polarization antenna and the second polarization antenna are integrated into one antenna apparatus. According to this configuration, it is possible to further reduce the size of the wireless sensor apparatus.

In the above-mentioned wireless sensor apparatus, the first and second polarization antennas can also adopt a configuration of commonly use a transmission antenna and a reception antenna.

In the above-mentioned wireless sensor apparatus, the first and second polarization antennas can also adopt a configuration of respectively separately being provided with a transmission antenna for radiating wireless waves by being fed with the pulse signal and a reception antenna for receiving a reflected wave reflected from an object and outputting first or second reception signal.

DETAILED DESCRIPTION OF THE DISCLOSURE

The following description is intended to convey a thorough understanding of the embodiments described by providing a number of specific embodiments and details involving a wireless sensor apparatus. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Hereinafter, with reference to the accompanying drawings, various embodiments of the disclosure will be described in detail. A wireless sensor apparatus according to an embodiment of the disclosure is provided with antennas having polarization characteristics which may be mutually orthogonal and may be configured to feed pulse signals generated by an RF oscillating circuit, for example, to the antennas for radiating two orthogonal polarized waves at the same time and detect a motion or the like of an object on the basis of a reflected wave obtained while this wireless wave is reflected by the object.

Figure 1:
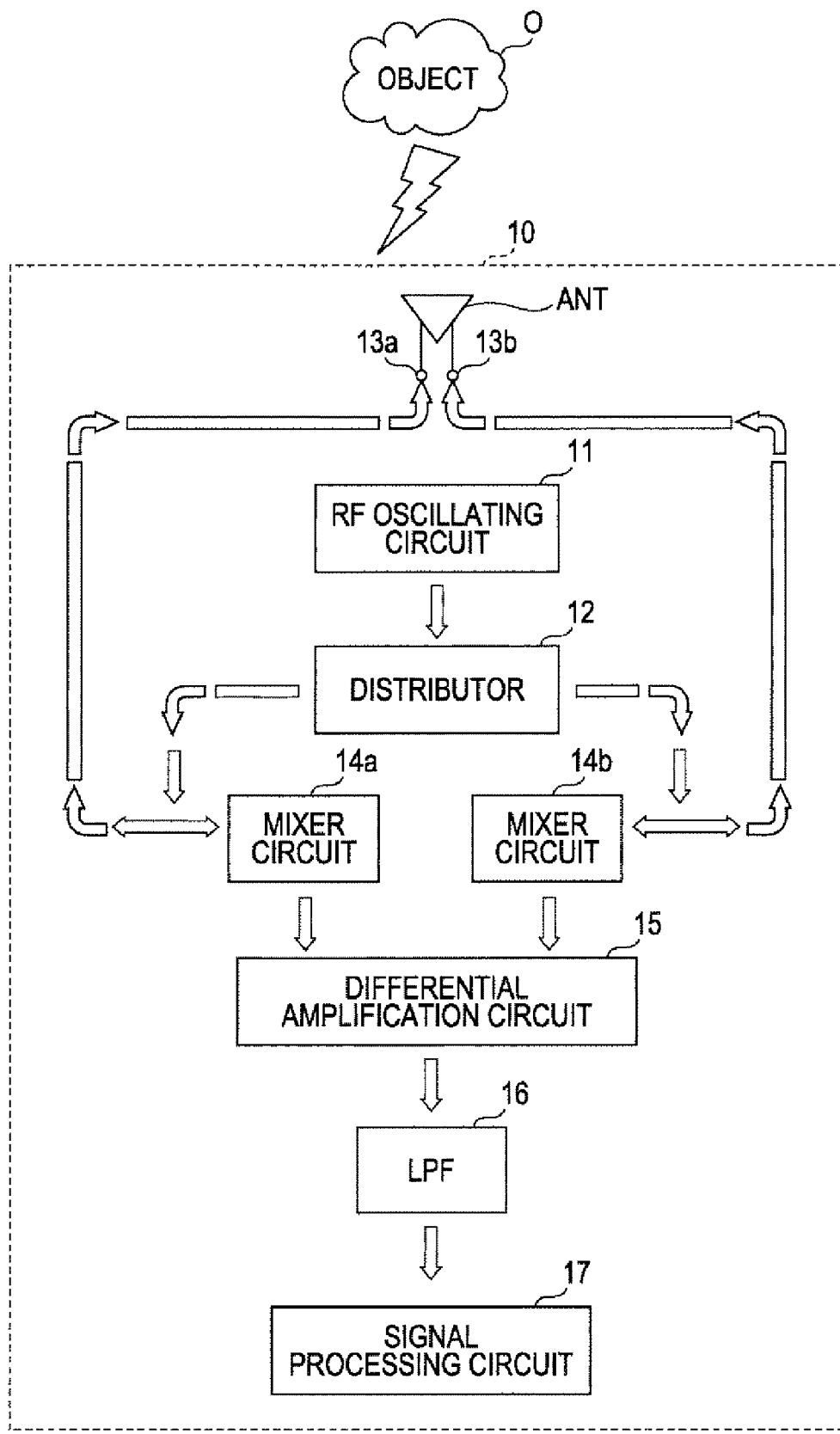
FIG. 1 is a functional block diagram of a wireless sensor apparatus according to an embodiment of the disclosure.

FIG. 1 is a functional block diagram of the wireless sensor apparatus according to the various embodiments. As shown in FIG. 1, a wireless sensor apparatus 10 may be composed of a transmission and reception antenna ANT, an RF oscillating circuit 11 for generating pulse signals to be supplied to the transmission and reception antenna ANT, and a distributor 12.

The RF oscillating circuit 11 may generate the pulse signals to be fed to the transmission and reception antenna ANT and transmitted to the distributor 12. The distributor 12 may distribute the pulse signals received from the RF oscillating circuit 11 to be respectively sent to feeding points 13a and 13b of the transmission and reception antenna ANT and also may send to mixer circuits 14a and 14b, respectively, a part of the pulse signals sent to the respective feeding points 13a and 13b of the transmission and reception antenna ANT.

The transmission and reception antenna ANT respectively configured so that polarization surfaces of the radiation waves are mutually orthogonal, and two mutual polarization components included in radiated wireless waves can be separated. As a component constituting the orthogonal polarization surfaces, for example, a linearly-polarized wave exists which forms an oscillating wave where a direction of the oscillation (polarization) of the electric field when the wireless wave propagates in a space is constant with respect to a travelling direction. In the case of this linearly-polarized wave, the polarization components may be orthogonal to each other with a vertical polarization where the polarization surface is vertical with respect to the ground surface and a horizontal polarization where the polarization surface is horizontal with respect to the polarization surface of this vertical polarization.

Figure 2A:
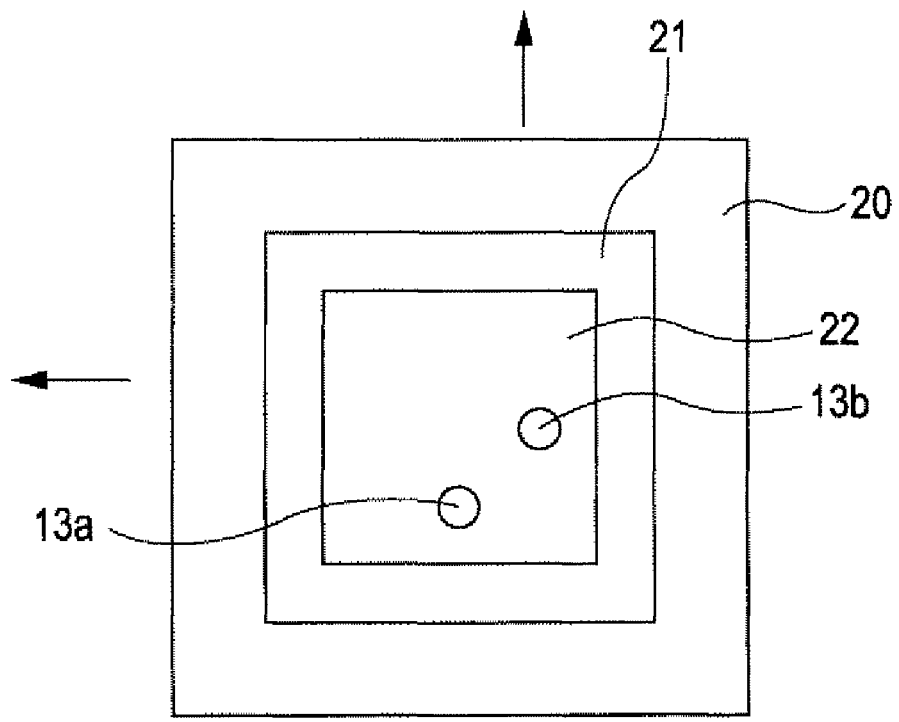
FIGS. 2A and 2B schematically show an example of an antenna element configuration of the wireless sensor apparatus according to the disclosure.

2A and 2B are pattern diagrams showing an example of an antenna element configuration of the transmission and reception antenna ANT to which the linearly-polarized wave is applied. FIG. 2A is a top view of the antenna element, and FIG. 2B is a cross sectional view of the antenna element.

Figure 2B:
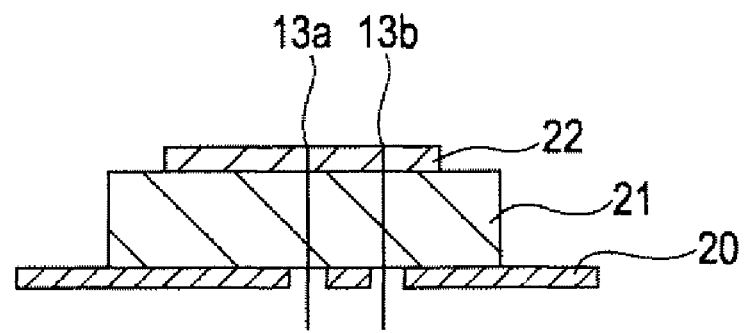
Figure 3:
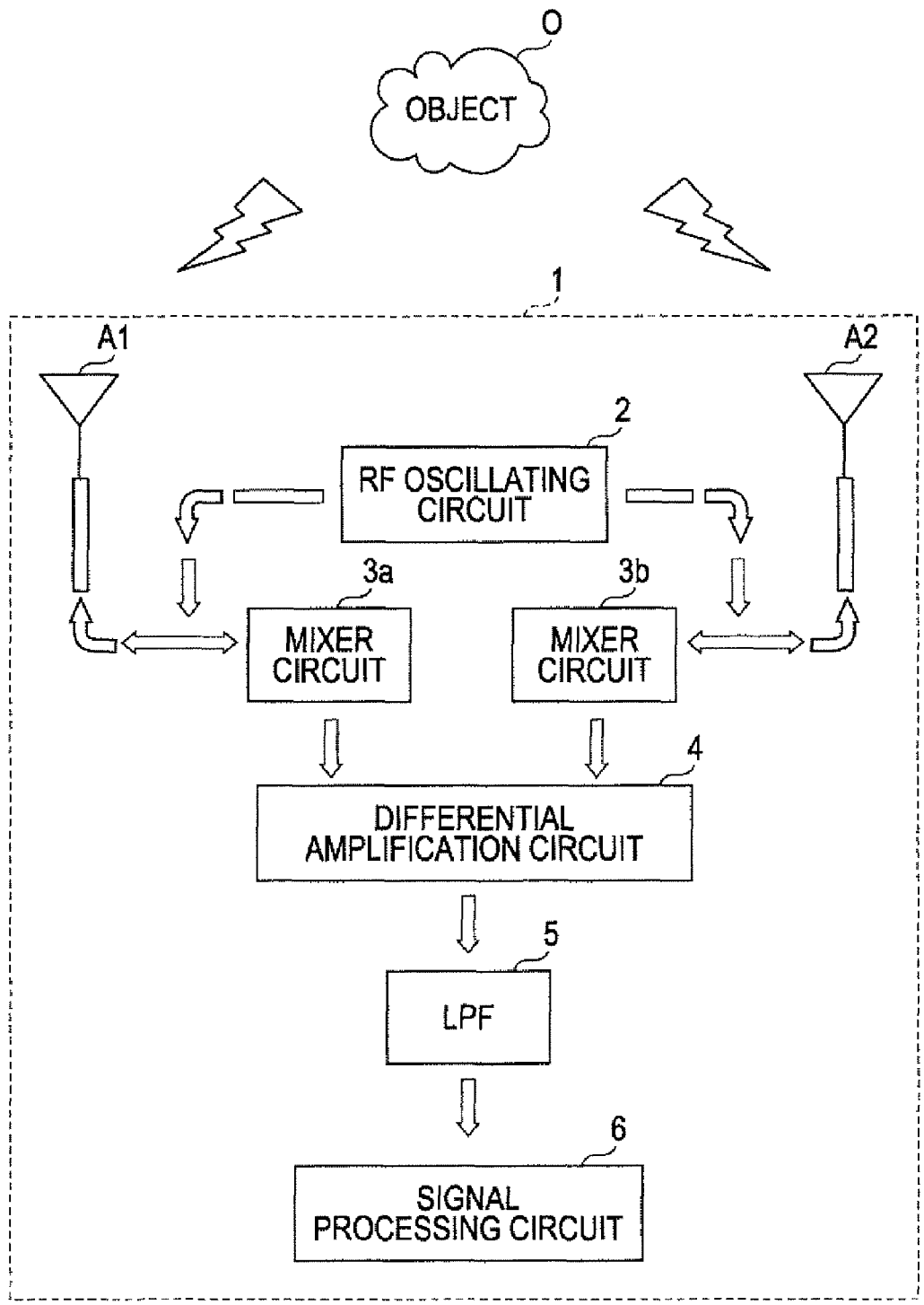
FIG. 3 shows a wireless sensor apparatus in related art.

As shown in FIGS. 2A and 2B, the antenna element may be composed of a dielectric 21 arranged on a ground plate 20 and an electrode unit 22 arranged on the dielectric 21. On the electrode unit 22, the two feeding points 13a and 13b may be arranged at positions where the polarization surfaces (polarization components) are mutually orthogonal. When the two feeding points 13a and 13b are respectively fed with the pulse signals via the distributor 12, the wireless waves (radiation waves) including the vertical polarization component and the horizontal polarization component may be radiated from the transmission and reception antenna ANT. Then, the wireless wave radiated from the transmission and reception antenna ANT may be reflected by the object O, and this reflected wave may be received by the transmission and reception antenna ANT as an electric signal. At this time, the vertical polarization component and the horizontal polarization component included in the reception signal may be respectively taken out by the respective feeding points 13a and 13b to be respectively sent to the mixer circuits 14a and 14b which will be described below. That is, as the polarization surface of the vertical polarization and the polarization surface of the horizontal polarization are orthogonal to each other, even in a case where the wireless waves having the same wavelength are overlapped and sent, the mutual polarization components may be orthogonal to each other, and therefore the mutual respective polarization components do not cause the interference. Also, in a case where the reflected wave is received as the reception signal, as the respective polarization components included in the reception signal are orthogonal to each other, the respective polarization components can be separated from each other, and the respective polarization components can be respectively taken out without suffering from the mutual interference at the respective feeding points 13a and 13b.

It is assumed that the feeding point 13a is a feeding point where a vertical polarization characteristic is realized, and the feeding point 13b is a feeding point where a horizontal polarization characteristic is realized. Also, the description is given while the pulse signal fed to the feeding point 13a is set as a first pulse signal, and the pulse signal fed to the feeding point 13b is set as a second pulse signal.

The wireless sensor apparatus 10 according to an embodiment may be composed of the two mixer circuits 14a and 14b, a differential amplification circuit 15, a low-pass filter (LPF) 16, and a signal processing circuit 17 as components on the reception side. To the mixer circuit 14a functioning as a first mixer circuit, via the distributor 12, a part of the first pulse signal fed to the feeding point 13a of the transmission and reception antenna ANT may be input as a local signal. Also, a reception signal receiving the reflected wave from the object O from the transmission and reception antenna ANT on the reception side (first reception signal) may be input to the mixer circuit 14a. The mixer circuit 14a may mix the first pulse signal with the first reception signal. Similarly, to the mixer circuit 14b functioning as a second mixer circuit, via the distributor 12, a part of the second pulse signal fed to the feeding point 13b of the transmission and reception antenna ANT may be input. Also, a reception signal receiving the reflected wave from the object O from the transmission and reception antenna ANT on the reception side (second reception signal) may be input to the mixer circuit 14b. The mixer circuit 14b may mix the second pulse signal with the second reception signal. At this time, from the two mixer circuits 14a and 14b, if the motion of the object O exists, the respective phase difference changes between the local signals and the reception signals are different from each other, and mutually different low frequency signals may be output.

On the other hand, if the motion of the object O does not exist, a signal having no change may be output from the two mixer circuits 14a and 14b. The signal output (mixed output) from each of the mixer circuits 14a and 14b may be input to the differential amplification circuit 15.

The respective signals input from the mixer circuits 14a and 14b at the same timing may be subjected to the differential amplification by the differential amplification circuit 15, and low frequency components may be taken out by the LPF 16. The low frequency signals passing through the LPF 16 may be converted into digital signals by an A/D converter which is not shown in the drawing are input to the signal processing circuit 17. In a case where the object O is moved, by analyzing a change in the low frequency signals output from the differential amplification circuit 15, the motion or the like of the object O may be detected. It should be noted that it is also possible to adopt a circuit configuration in which a DC cut circuit and an LPF are provided between the mixer circuits 14a and 14b and the differential amplification circuit 15.

Next, an operation of the wireless sensor apparatus 10 will be described.

When the pulse signals are generated by the RF oscillating circuit 11, the generated pulse signals may be sent via the distributor 12 to be sent as the first pulse signal to the feeding point 13a of the transmission and reception antenna ANT and as the second pulse signal to the feeding point 13b of the transmission and reception antenna ANT. The transmission and reception antennas ANT fed with the first and second pulse signals may respectively radiate the wireless waves composed of the vertical polarization component and the horizontal polarization component and also may receive the reflected waves obtained while the radiated wireless waves are reflected by the object O as electric reception signals. At this time, the transmission and reception antennas ANT may radiate the two wireless waves whose polarization surfaces mutually have an orthogonal relation at the same time, and therefore the wireless wave radiated from one antenna does not become a disturbance for the other antenna. The reception signal may be received in a state in which the vertical polarization component is combined with the horizontal polarization component. The vertical polarization component in the reception signal may be taken out by the feeding point 13a, and also the horizontal polarization component may be taken out by the feeding point 13b. The reception signal including the vertical polarization component obtained by the feeding point 13a may be input to the mixer circuit 14a, and the reception signal including the horizontal polarization component obtained by the feeding point 13b may be input to the mixer circuit 14b.

In the mixer circuit 14a, a part of the first pulse signal input from the RF oscillating circuit may be mixed with the reception signal including the vertical polarization component, and in the mixer circuit 14b, a part of the second pulse signal input from the RF oscillating circuit may be mixed with the reception signal including the horizontal polarization component. The signals output from the mixer circuit 14a and the mixer circuit 14b may be input to the differential amplification circuit 15 at the same timing. If the object O is moved, a change in the output signal of the mixer circuit 14a and a change in the output signal of the mixer circuit 14b vary from each other, and a difference of the changes is subjected for the differential amplification by the differential amplification circuit 15. Also, if the object O is in a halt state, the output of the mixer circuit 14a and the output of the mixer circuit 14b are stable signals. Therefore, the output change in the differential amplification circuit 15 becomes 0. As to the output signal of the differential amplification circuit 15, the low frequency signal is taken out by the LPF 16 to be input to the signal processing circuit 17. As the low frequency signal taken out by the LPF 16 includes information related to the motion or position of the object O, by analyzing this information, the motion or the like of the object O may be detected.

In this manner, according to the present embodiment, as the transmission and reception antennas ANT are configured so as to radiate the two wireless waves having the relation of the orthogonal polarized waves, even when the two wireless waves (radiation waves) from the transmission and reception antennas ANT are radiated at the same time, the wireless wave radiated from one antenna may be prevented from becoming a disturbance for the other antenna. Therefore, it is possible to prevent the mutual wireless waves from interfering each other between the antennas, and as it is not necessary to expand the antenna interval, the miniaturization of the wireless sensor apparatus can be realized. In particular, according to the present embodiment, the antennas whose polarization surfaces are orthogonal to each other (the vertical polarization antenna and the horizontal polarization antenna) may be integrated into one antenna apparatus, and it is therefore possible to further reduce the size of the wireless sensor apparatus 10.

It should be noted that according to the above-mentioned embodiment, as a component constituting the orthogonal polarization characteristic, the linearly-polarized wave has been described as the example, but the embodiment is not limited to this configuration. For example, a circularly polarized wave propagating in the space while the polarization direction is rotated can also be applied. In a case where the circularly polarized wave is applied, a right-handed circularly polarized wave rotating to the right and a left-handed circularly polarized wave rotating to the left may constitute the antenna elements having the orthogonal polarization characteristics.

Also, according to the various embodiments, the configuration has been described as an example in which the two antennas whose polarization surfaces are orthogonal to each other may be integrated into one antenna apparatus, and furthermore, the transmission antenna and the reception antenna may commonly use the single transmission and reception antenna ANT (shared use), but a configuration of using separate antennas can also be adopted as long as the combination has the mutually orthogonal polarization characteristics. For example, in the case of the linearly-polarized wave, the vertical polarization antenna and the horizontal polarization antenna can be constituted by separate antennas, and in the case of the circularly polarized wave, the right-handed circularly polarized wave and the left-handed circularly polarized wave can be constituted by separate antennas.

Also, a configuration may be adopted that the respective polarization antennas are separated into the transmission antenna and the reception antenna.

Also, the embodiment disclosed in the present application is an exemplification in every aspect and is not limited to this embodiment. The scope of the present invention is not indicated by only the description on the above-mentioned embodiment but is indicated by a scope of the claims and is intended to include all modifications having equivalent meanings to the claims and within the scope thereof.

The embodiments of the present disclosure are applicable to a wireless sensor apparatus configured to detect a motion or the like of an object on the basis of a reflected wave from the object by utilizing a wireless wave. Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A wireless sensor apparatus comprising:
   first and second polarization antennas whose polarization surfaces of radiation waves are mutually orthogonal;
   a first mixer circuit connected to the first polarization antenna and configured to input a first reception signal received by the first polarization antenna;
   a second mixer circuit connected to the second polarization antenna and configured to input a second reception signal received by the second polarization antenna;
   a signal generation circuit configured to generate pulse signals fed to the first and second polarization antennas and also supplied to the first and second mixer circuits; and
   a differential amplification circuit configured to perform a differential amplification on a mixed output obtained by mixing the first reception signal and the pulse signal by the first mixer circuit and a mixed output obtained by mixing the second reception signal and the pulse signal by the second mixer circuit.

2. The wireless sensor apparatus according to claim 1, wherein the first polarization antenna is composed of a vertical polarization antenna, and the second polarization antenna is composed of a horizontal polarization antenna.

3. The wireless sensor apparatus according to claim 1, wherein the first polarization antenna is composed of a right-handed circularly polarized wave antenna, the second polarization antenna is composed of a left-handed circularly polarized wave antenna.

4. The wireless sensor apparatus according to claim 1, wherein the first polarization antenna and the second polarization antenna are integrated into one antenna apparatus.

5. The wireless sensor apparatus according to claim 1, wherein the first and second polarization antennas commonly use a transmission antenna and a reception antenna.

6. The wireless sensor apparatus according to claim 1, wherein the first and second polarization antennas are respectively separately provided with a transmission antenna for radiating wireless waves by being fed with the pulse signal and a reception antenna for receiving a reflected wave reflected from an object and outputting first or second reception signal.

* * * * *